(12) United States Patent
Dietl

(10) Patent No.: US 7,766,413 B2
(45) Date of Patent: Aug. 3, 2010

(54) FOLDING TOP FOR A CONVERTIBLE

(75) Inventor: Rudolf Dietl, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/233,845

(22) Filed: Sep. 19, 2008

(65) Prior Publication Data

US 2009/0079227 A1   Mar. 26, 2009

(30) Foreign Application Priority Data

Sep. 20, 2007  (DE) ....................... 10 2007 044 943

(51) Int. Cl.
*B60J 7/12* (2006.01)
(52) U.S. Cl. .............. 296/116; 296/107.09; 296/107.15
(58) Field of Classification Search ............ 296/107.01, 296/109, 116, 117, 107.09, 107.15, 107.16
See application file for complete search history.

(56) References Cited

U.S. PATENT DOCUMENTS

| | | | | |
|---|---|---|---|---|
| 6,692,061 B1 * | 2/2004 | Willard | ....................... | 296/116 |
| 6,695,384 B2 * | 2/2004 | Obendiek et al. | ...... | 296/107.09 |
| 7,118,161 B2 * | 10/2006 | Neubrand | ............... | 296/107.15 |
| 2001/0017475 A1 * | 8/2001 | Busch | .................... | 296/107.01 |
| 2003/0052507 A1 * | 3/2003 | Obendiek et al. | ...... | 296/107.01 |
| 2003/0127883 A1 * | 7/2003 | Antreich | ................ | 296/107.01 |

FOREIGN PATENT DOCUMENTS

DE         10160240         6/2003

* cited by examiner

*Primary Examiner*—Jason S Morrow
(74) *Attorney, Agent, or Firm*—Fitch, Even, Tabin & Flannery; John M. Naber

(57) ABSTRACT

A folding top for a convertible is proposed, comprising a folding-top cloth (16) and a folding-top linkage (14) which is provided on both sides with a main link (28) which is mounted on a main bearing (26) and to which a frame part (38), which extends substantially in the longitudinal direction of the vehicle in the closed position of the top, and an intermediate link (44) are coupled. A front, rigid folding-top element (22) is connected via a first folding-top element link (58) to the intermediate link (44) and via a second folding-top element link (60) to the frame part (38). According to the invention, means are provided on the folding-top linkage (14), said means bringing about a continuous slowing-down of the front, rigid folding-top element (22) during the sequence of movement of the top from a storage position to the closed position.

8 Claims, 6 Drawing Sheets

FOLDING TOP FOR A CONVERTIBLE

The application claims priority from German Patent Application No.: 10 2007 044 943.9, filed Sep. 20, 2007, the contents of which are herein incorporated by reference.

The invention relates to a folding top for a convertible.

A folding top of this type is known, for example, from DE 101 60 240 B4 and is provided with a folding-top cloth and a folding-top linkage which can be actuated by means of a driving device such that the top, in a closed position, spans a vehicle interior and, in an open position, opens up the vehicle interior and is arranged in a rear folding-top storage compartment. The folding-top linkage of said folding top comprises respective folding-top kinematic mechanisms arranged mirror-symmetrically with respect to each other on both sides and having a driven main link and a main pillar. The main link and the main pillar are mounted pivotably on a main bearing arranged in the region of the folding-top storage compartment and are each connected in an articulated manner to a central frame part for the folding-top cloth. The main link forms a rear frame part. Furthermore, a front bow is connected to the folding-top kinematic mechanism via an intermediate link and two front bow links, said front bow, in a closed position of the top, being adjacent to an upper transverse strut or a cowl of a windshield of the motor vehicle in question and having a respective front frame part at its lateral edges. During opening of the top, the folding-top cloth, in order to be put away in the rear folding-top compartment, executes a "Z-type folding", i.e. the upper side of the folding-top bow remains arranged at the top even in the open position of the top, and the folding-top cloth is folded in two regions during the opening operation.

The folding-top linkage known from DE 101 60 240 B4 is a ten-bar kinematic mechanism with three partial four-bar mechanisms coupled in a simple manner. The simple coupling results in unfavorable actuating speeds in the end position, in particular in the stretched position reached shortly before the closed position is reached, thus possibly resulting in insufficient tensioning forces. Furthermore, the front bow has a high path profile during the opening and closing of the top, which may be disadvantageous, for example in the event of actuation in a low garage.

The invention is based on the object of providing a folding top of the generic type mentioned at the beginning, in which an optimized path, of movement of a front bow and optimized closing forces during the opening and closing of the top can be realized.

According to the invention, a folding top for a convertible is consequently proposed, the folding top comprising a folding-top cloth and a folding-top linkage which is provided on both sides with a main link which is mounted on a main bearing and to which a frame part, which extends substantially in the longitudinal direction of the vehicle in the closed position of the top, and an intermediate link are coupled, with a front, rigid folding-top element being connected via a first folding-top element link to the intermediate link and via a second folding-top element link to the frame part. Means are provided on the folding-top linkage, said means bringing about a continuous slowing-down of the front, rigid folding-top element during the sequence of movement of the top from a storage position to the closed position.

The closing forces required in the stretched position of the top can in turn be realized by means of such a design.

In a preferred embodiment of the folding top according to the invention, a guide link is arranged between the frame part and the intermediate link, and a coupling element defined by at least two points of articulation is arranged between the intermediate link and/or the guide link, on the one hand, and the first and/or the second folding-top element link, on the other hand.

By integrating the coupling element and the intermediate link into the folding-top kinematic mechanism, it is possible, in particular when closing the top, to realize a slowed-down movement of the front folding-top element in the region of the front end position or shortly before the front end position is reached, as a result of which it is possible in turn to realize the closing forces required in the stretched position of the top. Consequently, in the case of the folding top according to the invention, the closing speed can be retarded in the region of the front closure of the folding top. Furthermore, it is possible to realize a low lifting curve of the front folding-top element during the opening or closing of the top, which proves positive in particular when actuating the top in low spaces or garages. A low lifting curve also proves positive in the event of the top being actuated while the vehicle in question is traveling slowly, since the top therefore supplies a smaller engagement surface for relative wind.

In a special embodiment of the folding top according to the invention, the front folding-top element is a front bow which, in the closed position of the top, is adjacent to A pillars of a vehicle body. Of course, it is also conceivable for the front folding-top element to be a link which connects two points of articulation and for a front bow of the top to be connected to one of the folding-top element links or to form the latter. The coupling element which converts the movement of the intermediate link or of the guide link into a pivoting movement of the front folding-top element can be a link element, an eccentric element or the like. For example, the coupling element is designed as a short toggle lever or an eccentric bolt. It is also conceivable for the coupling element to be designed as a fully floating spindle which connects the relevant two links to each other. In this case, the two points of articulation or pivot axes of the coupling element coincide.

In a preferred embodiment of the folding top according to the invention, the coupling element is arranged between the intermediate link and one of the folding-top element links. This embodiment can be realized in a technically simple manner.

As customary, the frame part can be connected via a joint to a main pillar which is mounted pivotably on the main bearing and, together with the main link, is part of a main four-bar mechanism, is not driven and guides the movement of the folding-top linkage.

The first folding-top element link is in particular a front link, with reference to the vehicle body, whereas the second folding-top element link is a rear link, with reference to the vehicle body.

The folding top according to the invention generally comprises three frame parts, namely a front, a central and a rear frame part, on both sides. The front frame part can be formed in particular on the front folding-top element which can constitute a front bow or a roof peak. The central frame part is the frame part which is coupled to the main link. The rear frame part can be formed by the main link itself or can be formed thereon. However, in an alternative embodiment, the rear frame part can also be formed by the main pillar. Seals for the side windows of the motor vehicle in question are customarily arranged on the frame parts.

Further advantages and advantageous refinements of the folding top according to the invention can be gathered from the description, the drawing and the patent claims.

A preferred exemplary embodiment of the folding top according to the invention is illustrated schematically in simplified form in the drawing and is explained in more detail in the description below. In the drawing FIG. 1 shows a side view of a folding top according to the invention in the closed position;

Figure 1:
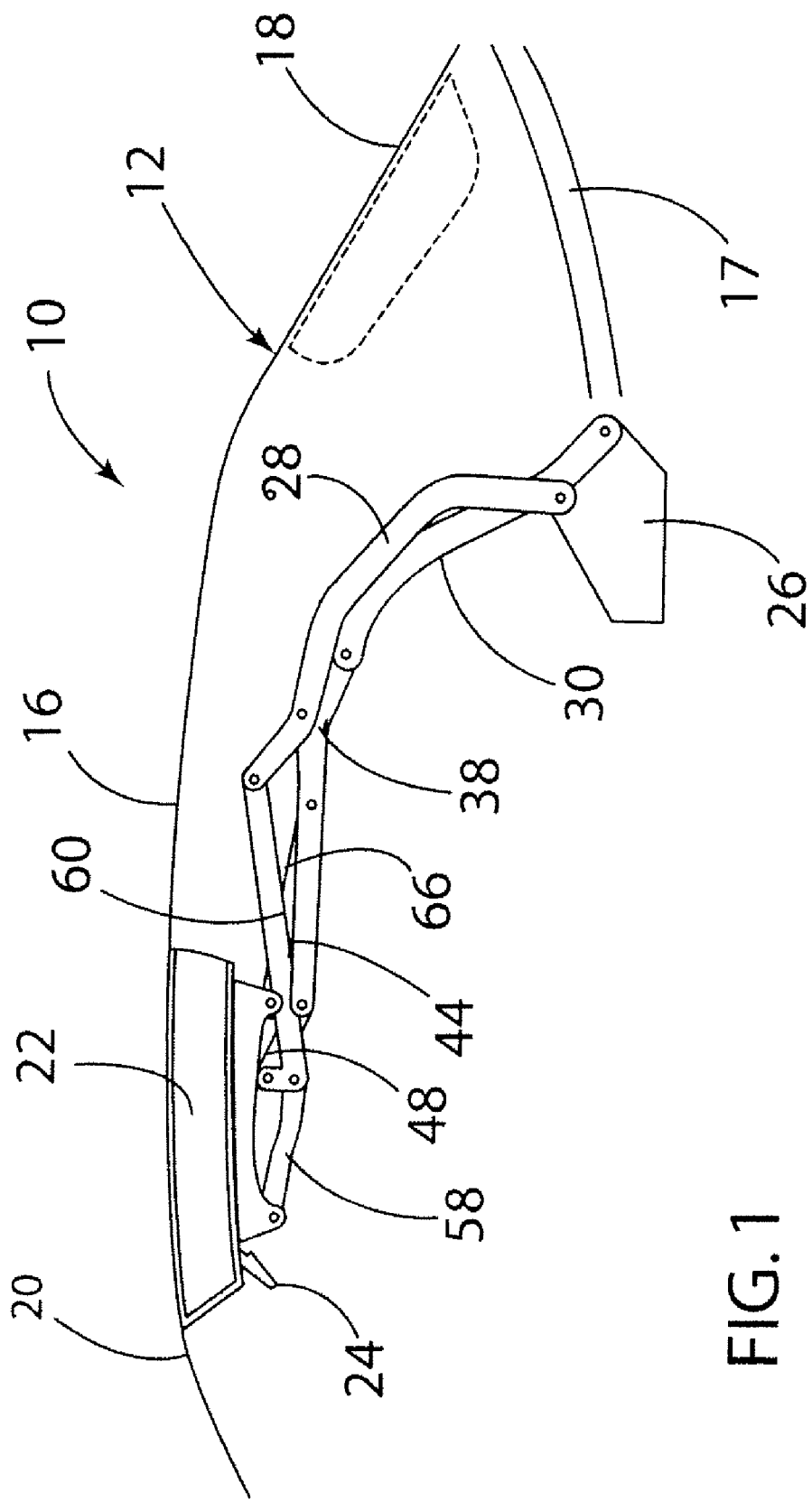
Figure 5:
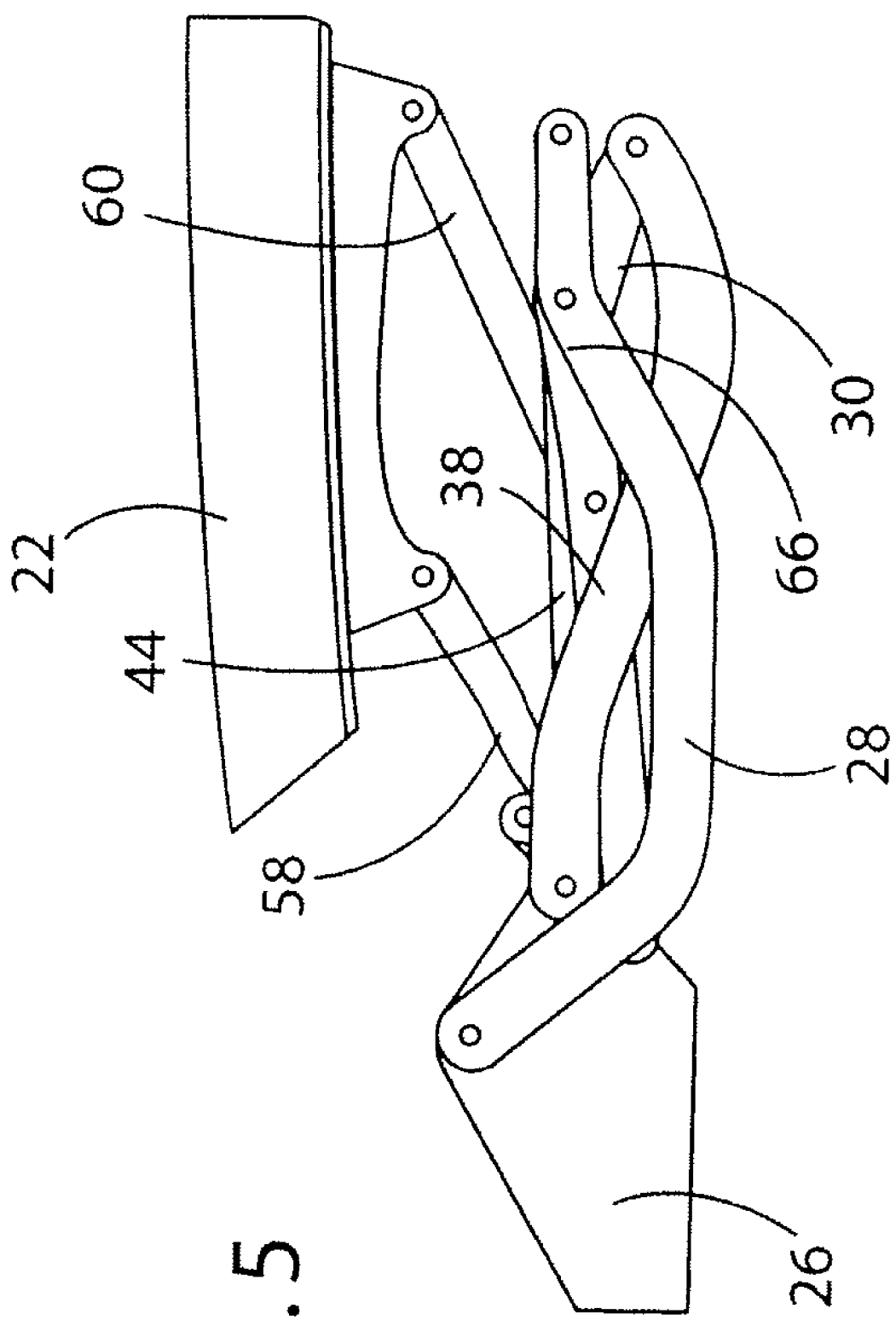
FIG. 5 shows an open position of the folding-top linkage.

FIG. 1 illustrates a highly schematized partial side view of a motor vehicle 10 which is designed as a convertible and is provided with a folding top 12 which can be actuated between a closed position, which is illustrated in FIG. 1 and covers a vehicle interior, and an open position, which is illustrated in FIG. 5 in respect of a folding-top linkage 14. Further intermediate bows for shaping the top in the closed position are not illustrated in the present case.

Figure 3:
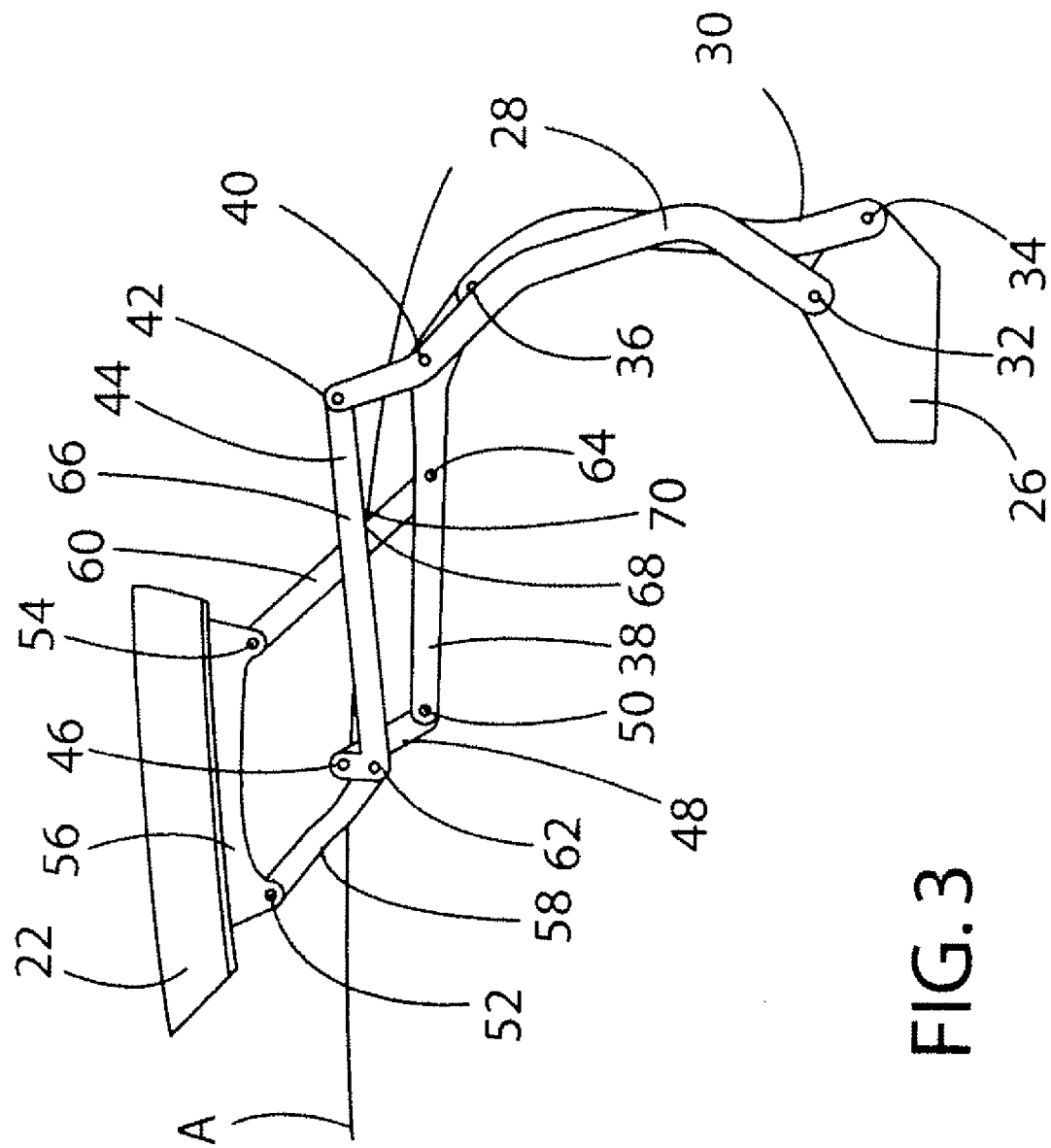
FIG. 3 shows a first intermediate position of a folding-top linkage of the folding top according to FIG. 1.
Figure 4:
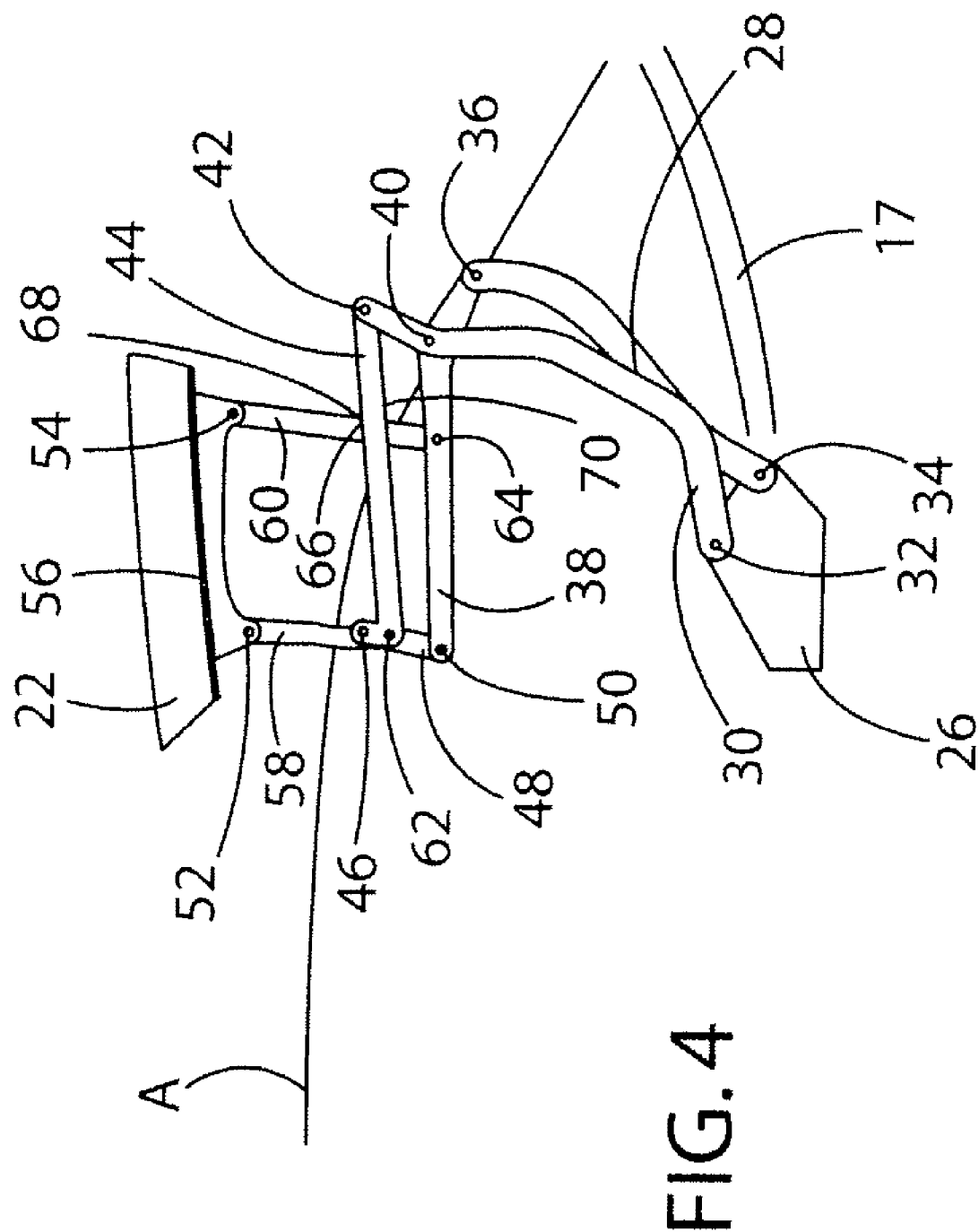
FIG. 4 shows a second intermediate position of the folding-top linkage.

In addition to the folding-top linkage 14, the folding top 12 comprises a folding-top cloth 16 which is provided with a rear window 18 in its rear region and, in the closed position illustrated in FIG. 1, is stretched by the folding-top linkage 14 between a rear tensioning bow 17 and a front cowl 20 of the vehicle body and has a stretched profile A which is also illustrated for visualization purposes in FIGS. 3 and 4 which show intermediate positions of the top. In its region adjacent to the front cowl 20, the top 12 or the folding-top linkage 14 comprises a front bow 22 which extends in the transverse direction of the vehicle, constitutes a roof peak and, in the region of the front cowl 20, can be fixed by means of a locking mechanism 24, for example to A pillars of the vehicle body, such that the closed position of the folding top 12 is secured.

The folding top 12 is of substantially mirror-symmetrical design with regard to a longitudinal center plane of a vehicle. For this reason, the folding top 14 is described below only with reference to the folding-top region arranged on the left in the direction of travel. The folding-top region arranged on the right is of corresponding design.

The folding-top linkage 14 comprises, on both sides, a respective main bearing 26 which is arranged in the region of a rear folding-top storage compartment (not illustrated specifically) and on which a main link 28, which is driven by means of a hydraulic cylinder or electric motor (likewise not illustrated specifically) is mounted pivotably via a point of articulation 32 and a main pillar 30 is mounted pivotably via a point of articulation 34.

The main pillar 30 is connected via a point of articulation 36 to a central frame part 38 which constitutes a longitudinal strut, extends substantially in the longitudinal direction of the vehicle and is also connected to the main link 28 via a point of articulation 40 in order to form a main four-bar mechanism defined by the points of articulation 32, 34, 36 and 40. With reference to the vehicle body, the point of articulation 40 lies upstream of the point of articulation 36 which is arranged on the rear side.

At the end which faces away from the point of articulation 32, the main link 28 has a further point of articulation 42 via which an intermediate link 44 which likewise extends substantially in the longitudinal direction of the vehicle is coupled. In a region facing away from the point of articulation 42, the intermediate link 44 is connected via a point of articulation 46 to a guide link 48 which, in turn, is coupled at its end facing away from the point of articulation 46 via a point of articulation 50 to that end of the central frame part 38 which faces away from the point of articulation 36.

The front bow 22 which extends in the transverse direction of the vehicle has, on both sides, in each case two bearing points 52 and 54 which are formed on a support 56 and to which a forward front bow link 58 and a rear front bow link 60 are coupled. The forward front bow link 58 is coupled at its end facing away from the bearing point 52 via a point of articulation 62 in the region of the front end of the intermediate link 44. The rear front bow link 60 is coupled at its end facing away from the bearing point 54 in a central region of the central frame part 38 via a point of articulation 64. Consequently, the central frame part has four points of articulation 36, 40, 50 and 64. The points of articulation 40, 42, 46 and 50 form a second four-bar mechanism.

Furthermore, a coupling element 66 is formed between the intermediate link 44 and the rear link 60, said coupling element, in the present case, being an eccentric element which is coupled on one side via a point of articulation 68 to the rear link 60 and on the other side via a point of articulation 70 to the intermediate link 44.

In the present case, a rear frame part is formed by the main link 28. A front frame part is formed along the lateral edge of the front bow 22. In the closed position illustrated in FIG. 1, the front frame part, the central frame part and the rear frame part are aligned with one another.

The kinematic mechanism described above constitutes a 13-bar mechanism in which favorable opening and closing forces can always be realized by means of the lengths of the links and positions of the points of articulation which are matched to the respective requirements.

Figure 2:
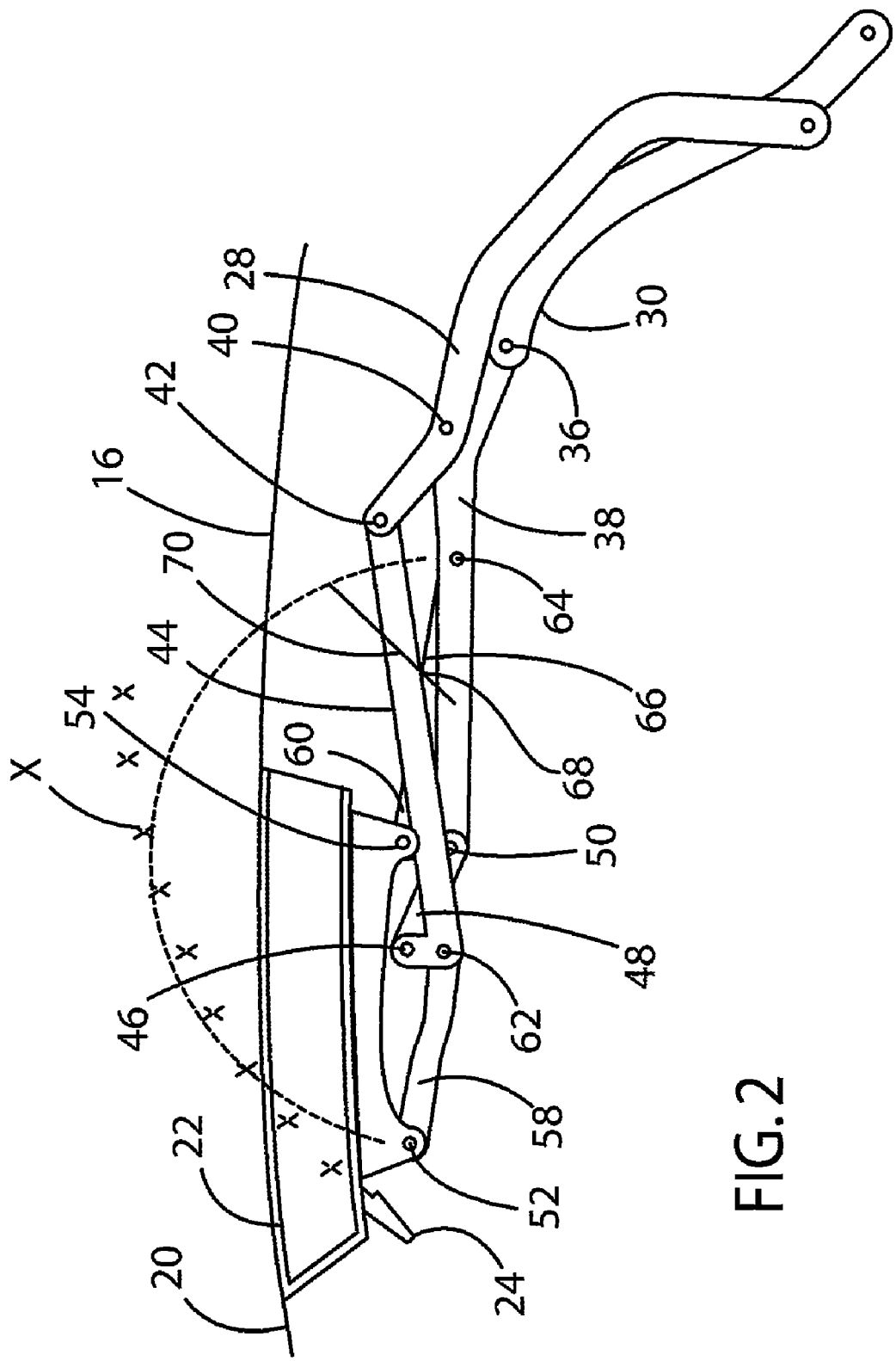
FIG. 2 shows an enlarged illustration of a folding-top linkage region in which a path of movement of a front bow is illustrated.

In particular, it is possible, by means of the embodiment described above, for the front bow 22 to execute a low or shallow path of movement, which is illustrated by crosses X in FIG. 2, when the folding top 12 is actuated. Furthermore, it is possible that, by means of the corresponding transmission ratios with regard to coupling of the various partial four-bar mechanisms mentioned to the links connected as described above, the speed of movement of the front bow 22 is slowed down upon reaching the extended position of the folding top 12 that is illustrated in FIG. 1 and the tensioning or closing forces initiated are of a magnitude sufficient in order to lock the folding top 12 in a favorable manner to the locking mechanism 24 and therefore to secure the closed position of the folding top 12.

Figure 6:
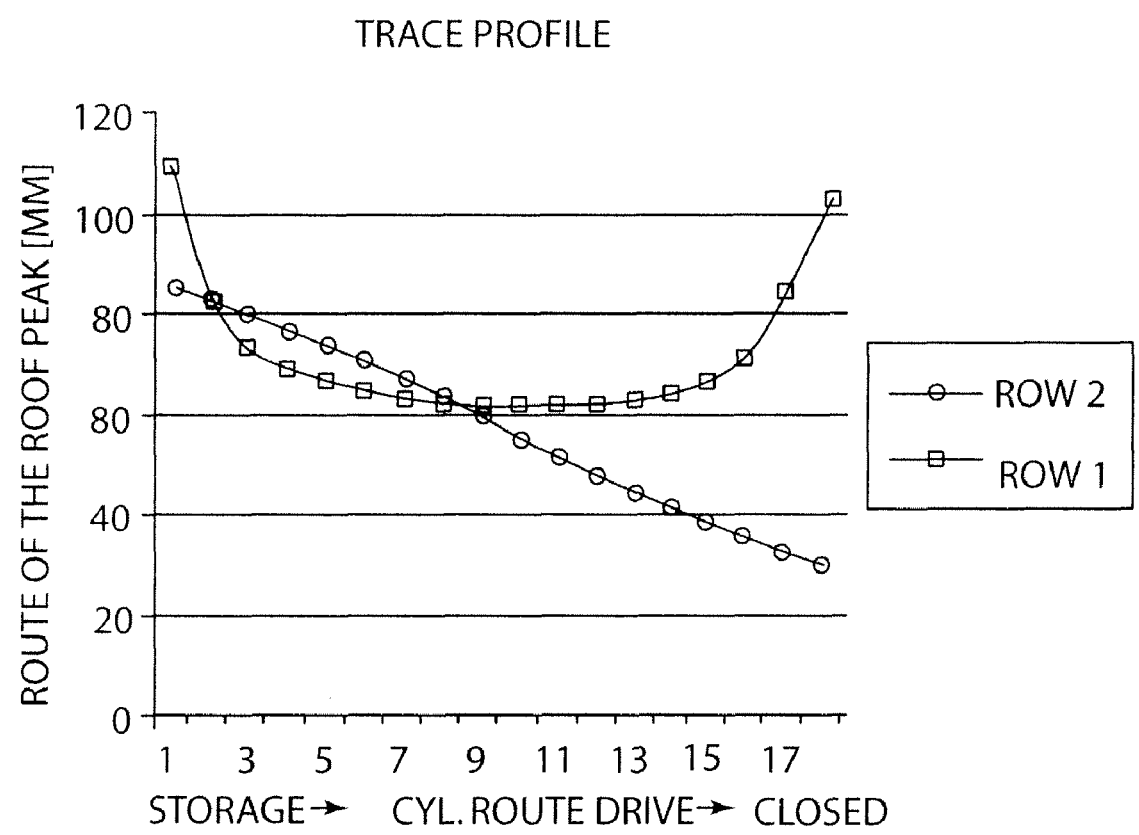
FIG. 6 shows a diagram in which the incrementation profile during the closing of the top in the case of a folding top according to the invention and a folding top according to the prior art are compared.

FIG. 6 illustrates a "trace profile" for a folding top according to the invention (row 1) and for a folding top according to the prior art (row 2). In this case, the route of the roof peak or of the front bow is illustrated in each case against the steps executed between the open or storage position and the closed position of the respective folding top. As can be gathered from the diagram and the table below, which contains exemplary values plotted in the diagram, the incrementation for the folding top according to the invention decreases further continuously, i.e. the closing operation slows down, such that the tensioning or closing forces required in order to close the folding top are reduced in comparison to the folding top according to the prior art because of the resulting transmission ratio. In the prior art, the incrementation and therefore the closing speed drastically increase shortly before the closed position of the roof peak is reached.

TABLE

| Step | Route of the roof peak (mm) invention | Route of the roof peak (mm) Prior art |
| --- | --- | --- |
| 1 | 85.69 | 108.5 |
| 2 | 82.06 | 80.84 |
| 3 | 79.24 | 72.87 |
| 4 | 76.57 | 68.64 |
| 5 | 73.71 | 66.02 |
| 6 | 70.54 | 64.3 |
| 7 | 67.03 | 63.12 |
| 8 | 63.25 | 62.33 |
| 9 | 59.32 | 61.8 |
| 10 | 55.36 | 61.8 |
| 11 | 51.47 | 61.6 |
| 12 | 47.75 | 61.8 |
| 13 | 44.26 | 62.5 |
| 14 | 41.03 | 63.7 |
| 15 | 38.06 | 66.1 |
| 16 | 35.36 | 71.01 |
| 17 | 32.87 | 84.11 |
| 18 | 30.52 | 102.42 |

In the embodiment illustrated in FIGS. 1 to 5, the folding-top cloth during the opening operation executes a "rotatory Z-type folding", i.e., during the opening operation, the front bow substantially maintains its orientation and the folding-top cloth is folded in two regions. However, as an alternative, it is also conceivable for a front bow to be fastened, for example, to the front link 58 or to replace the latter and, during the opening of the folding top, to execute a pivoting movement such that its lower side points upwards in the storage position. In an embodiment of this type, the folding-top cloth executes a "K-type folding".

The invention claimed is:

1. A folding top for a convertible, comprising a folding-top cloth and a folding-top linkage which is provided on both sides with a main link which is mounted on a main bearing and to which a frame part, which extends substantially in the longitudinal direction of the vehicle in the closed position of the top, and an intermediate link are coupled, with a front, rigid folding-top element being connected via a first folding-top element link to the intermediate link and via a second folding-top element link to the frame part, wherein means are provided on the folding-top linkage, said means bringing about a continuous slowing-down of the front, rigid folding-top element during the sequence of movement of the top from a storage position to the closed position, and wherein the means are designed in such a manner that a guide link is arranged between the frame part and the intermediate link, and a coupling element defined by at least two points of articulation is arranged between the intermediate link and/or the guide link, on the one hand, and the first folding-top element link and/or the second folding-top element link, on the other hand.

2. The folding top of claim 1, wherein the folding-top element is a front bow which, in the closed position, is adjacent to A pillars of a vehicle body.

3. The folding top of claim 1, wherein the coupling element is a link element or an eccentric element.

4. The folding top of claim 1, wherein the coupling element is arranged between the intermediate link and one of the folding-top element links.

5. The folding top claim 1, wherein the frame part is connected to a main pillar mounted on the main bearing.

6. The folding top of claim 1, wherein the first folding-top element link is a front link, with reference to the vehicle body, and the second folding-top element link is a rear link, with reference to the vehicle body.

7. The folding top of claim 1, wherein the main link comprises a rear frame part of the top.

8. The folding top of claim 1, wherein the front folding-top element comprises a front frame part of the top.

* * * * *